United States Patent
Lee

(10) Patent No.: US 12,498,007 B2
(45) Date of Patent: Dec. 16, 2025

(54) PAD SPRING AND CALIPER BRAKE HAVING THE SAME

(71) Applicant: HL MANDO CORPORATION, Pyeongtaek-si (KR)

(72) Inventor: Seyeon Lee, Pyeongtaek-si (KR)

(73) Assignee: HL MANDO CORPORATION, Pyeongtaek si (KR)

( * ) Notice: Subject to any disclaimer, the term of this patent is extended or adjusted under 35 U.S.C. 154(b) by 545 days.

(21) Appl. No.: 17/886,639

(22) Filed: Aug. 12, 2022

(65) Prior Publication Data

US 2023/0059238 A1  Feb. 23, 2023

(30) Foreign Application Priority Data

Aug. 17, 2021 (KR) .................. 10-2021-0108163

(51) Int. Cl.
*F16D 65/097* (2006.01)
*F16D 55/226* (2006.01)
*F16D 127/02* (2012.01)

(52) U.S. Cl.
CPC ....... *F16D 65/0977* (2013.01); *F16D 55/226* (2013.01); *F16D 2127/02* (2013.01)

(58) Field of Classification Search
None
See application file for complete search history.

(56) References Cited

U.S. PATENT DOCUMENTS

| | | | | |
|---|---|---|---|---|
| 2017/0248182 A1* | 8/2017 | Kim | ................... | F16D 65/0972 |
| 2018/0023645 A1* | 1/2018 | Reynolds | .............. | F16D 55/226 |
| | | | | 188/73.38 |
| 2022/0056969 A1* | 2/2022 | Fumagalli | ............. | F16D 55/228 |
| 2023/0332656 A1* | 10/2023 | Chang | ................... | F16D 65/092 |

FOREIGN PATENT DOCUMENTS

| | | | | |
|---|---|---|---|---|
| KR | 1020170010547 | * | 2/2017 | ......... F16D 65/0973 |
| KR | 10-1733937 B1 | | 5/2017 | |
| KR | 10-2210465 B1 | | 1/2021 | |

OTHER PUBLICATIONS

English-language abstract for KR 1020170010547 (no date).*

* cited by examiner

*Primary Examiner* — Nicholas J Lane
(74) *Attorney, Agent, or Firm* — LEE, HONG, DEGERMAN, KANG & WAIMEY

(57) ABSTRACT

Disclosed are a pad spring and a caliper brake having the same. The pad spring, which is installed on a coupling projection protruding from a carrier to slidably support a pair of pad plates, includes a first return part formed to extend downwardly from an upper side of the pad spring to elastically support and return the pad plate to its original position, and a second return part spaced apart from the first return part by a predetermined distance and provided at a position where the first return part is elastically deformed depending on an operation of the pad plate, wherein when the first return part is elastically deformed, the second return part comes into contact with the first return part to be elastically deformed together with the first return part and apply an elastic restoring force to the pad plate.

18 Claims, 10 Drawing Sheets

[FIG. 1]
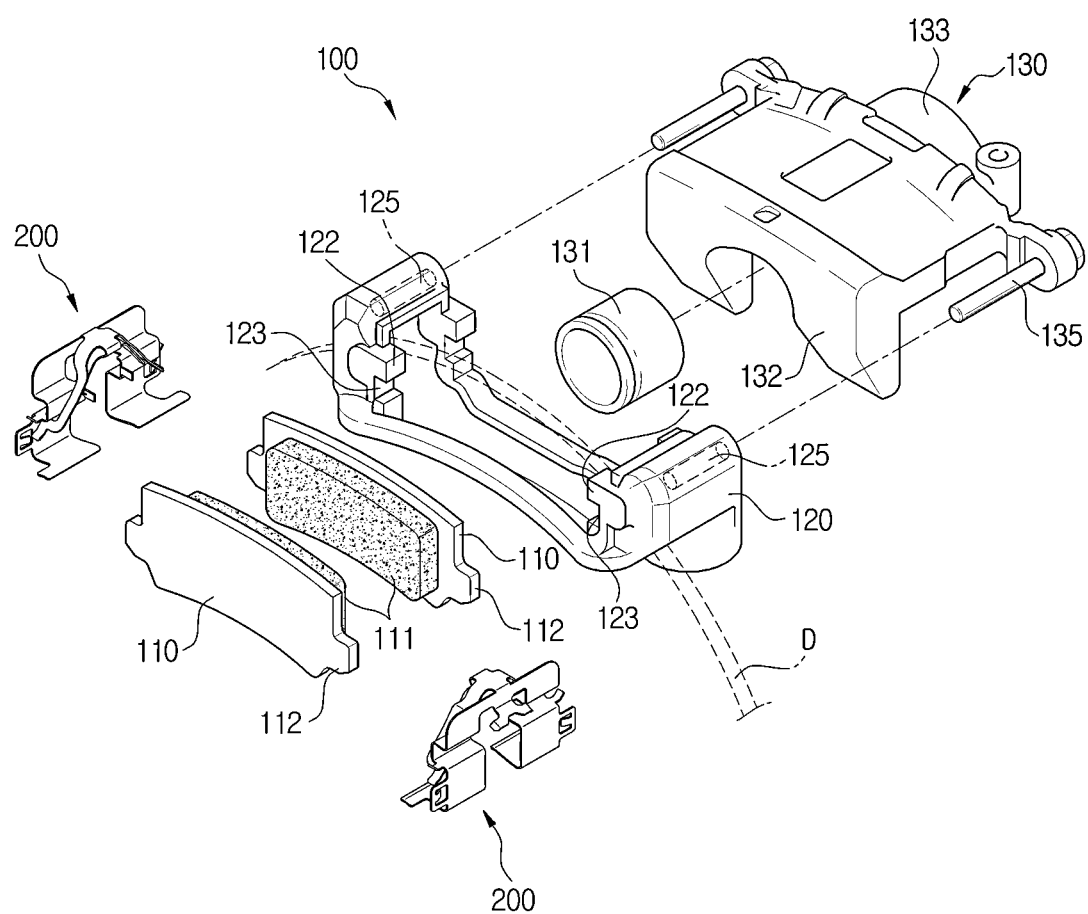

[FIG. 2]
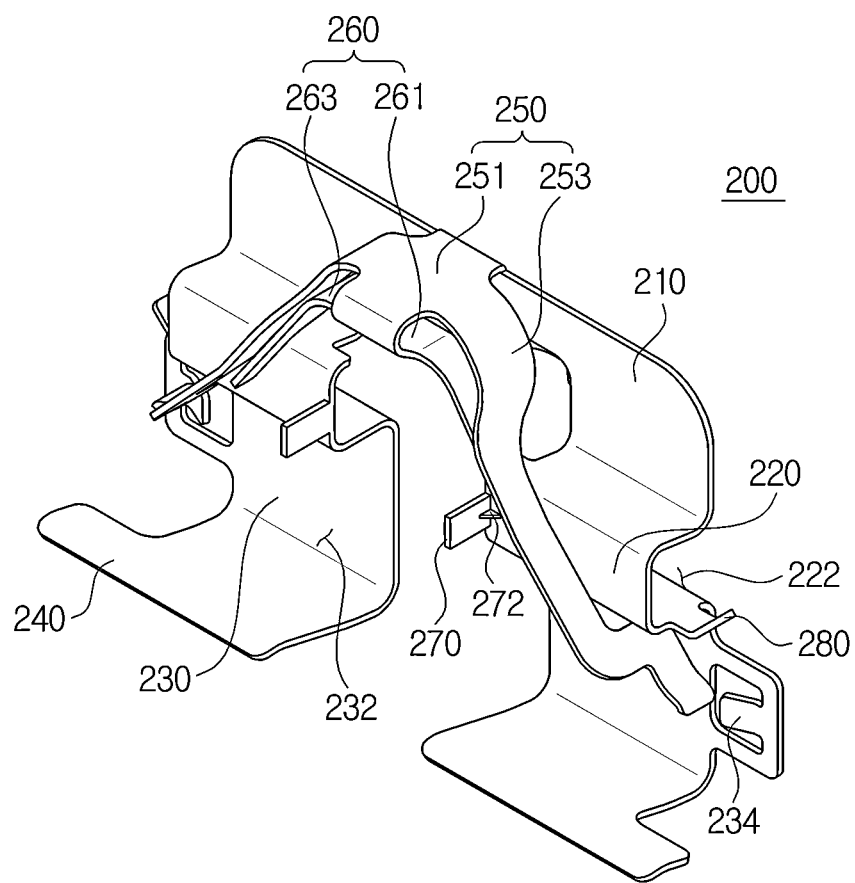

[FIG. 3]
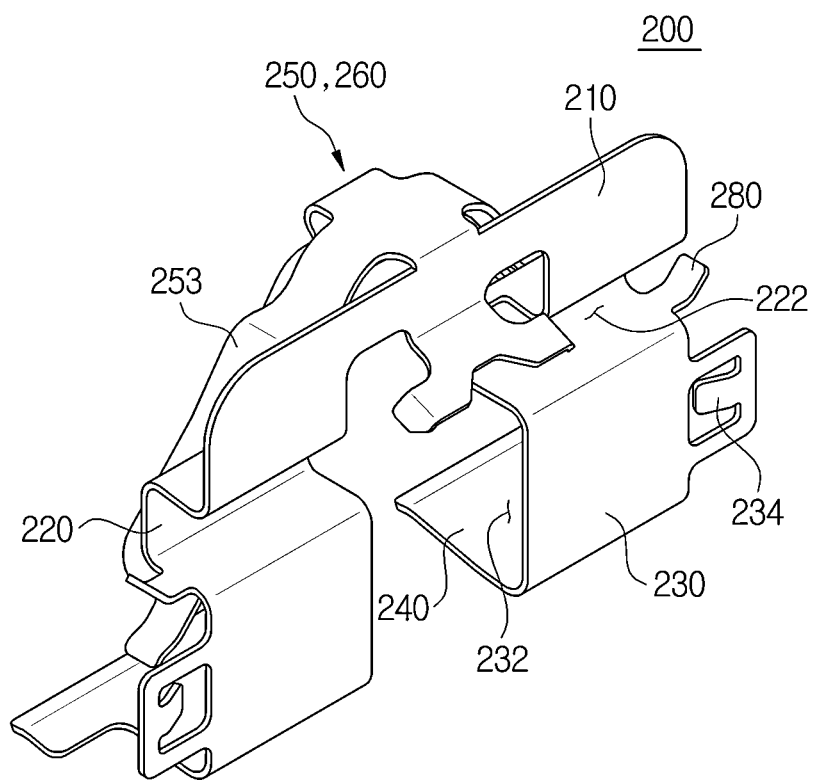

[FIG. 4]
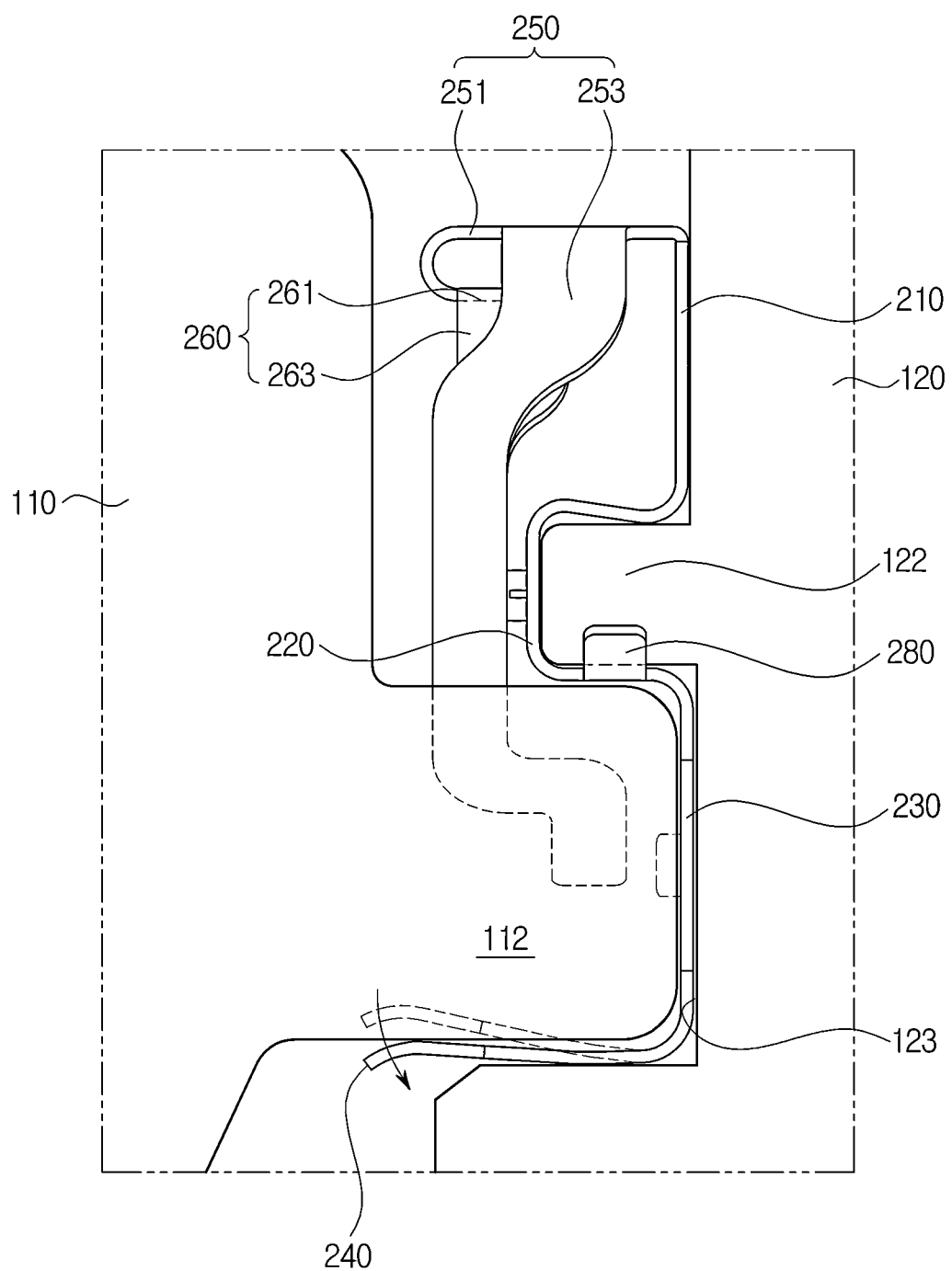

[FIG. 5]
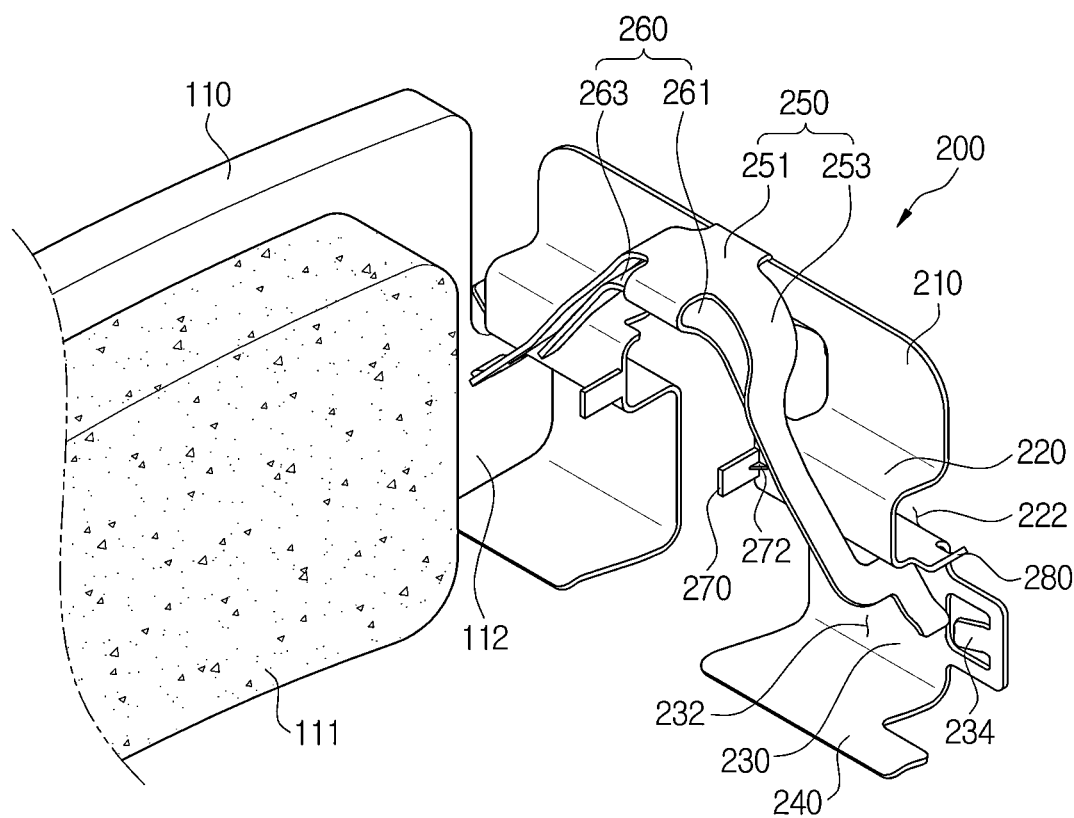

[FIG. 6]
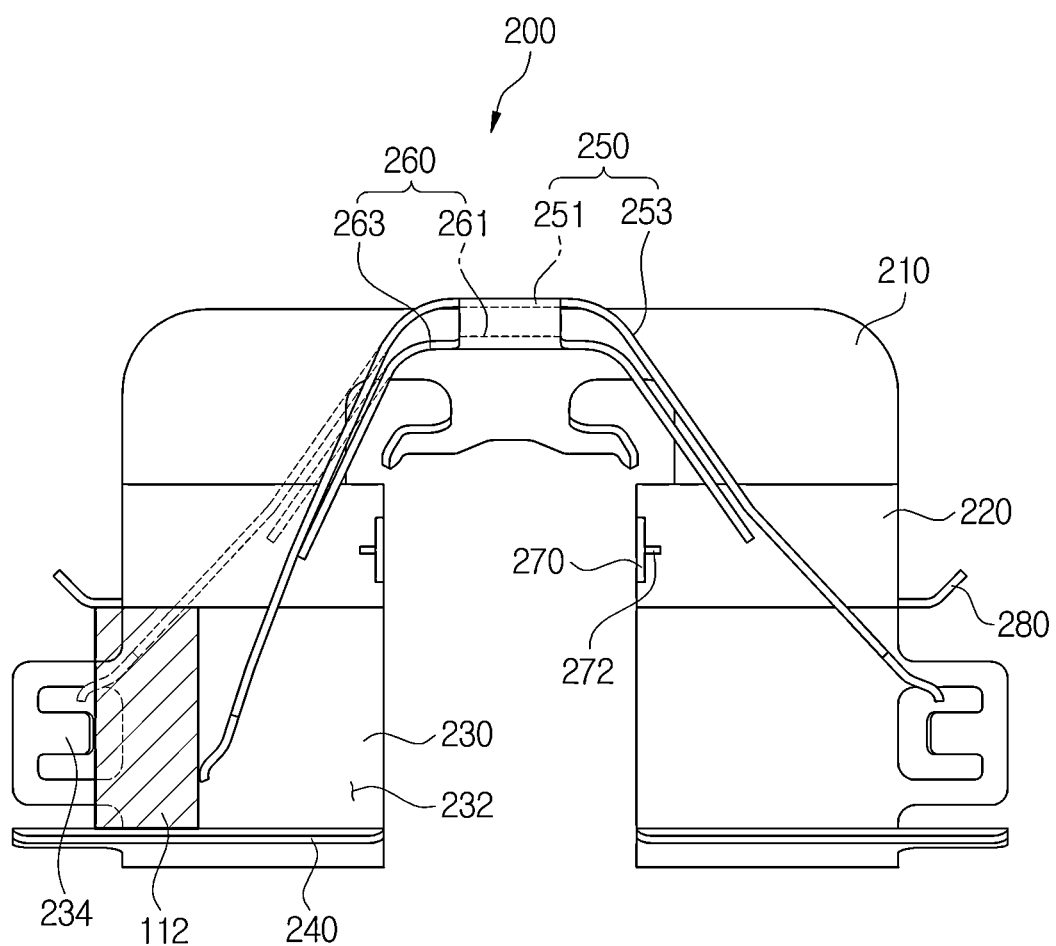

[FIG. 7]
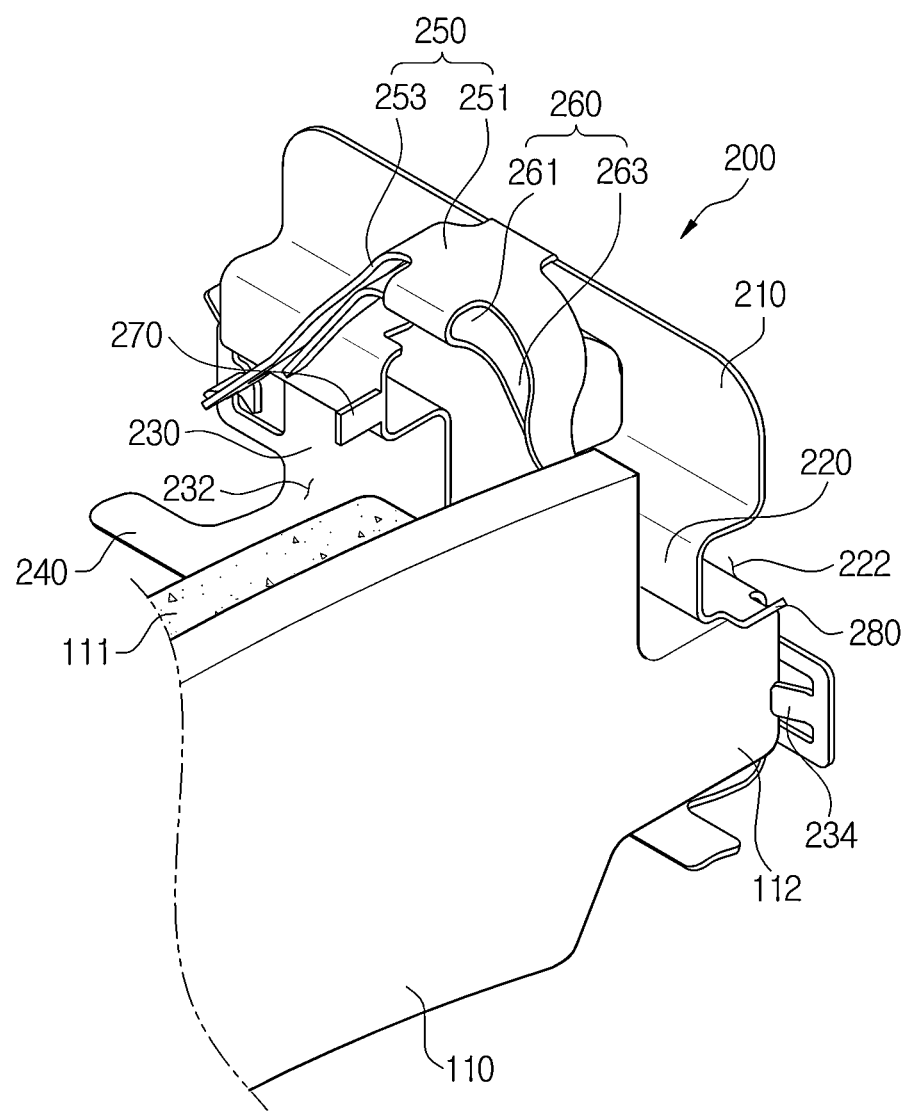

[FIG. 8]
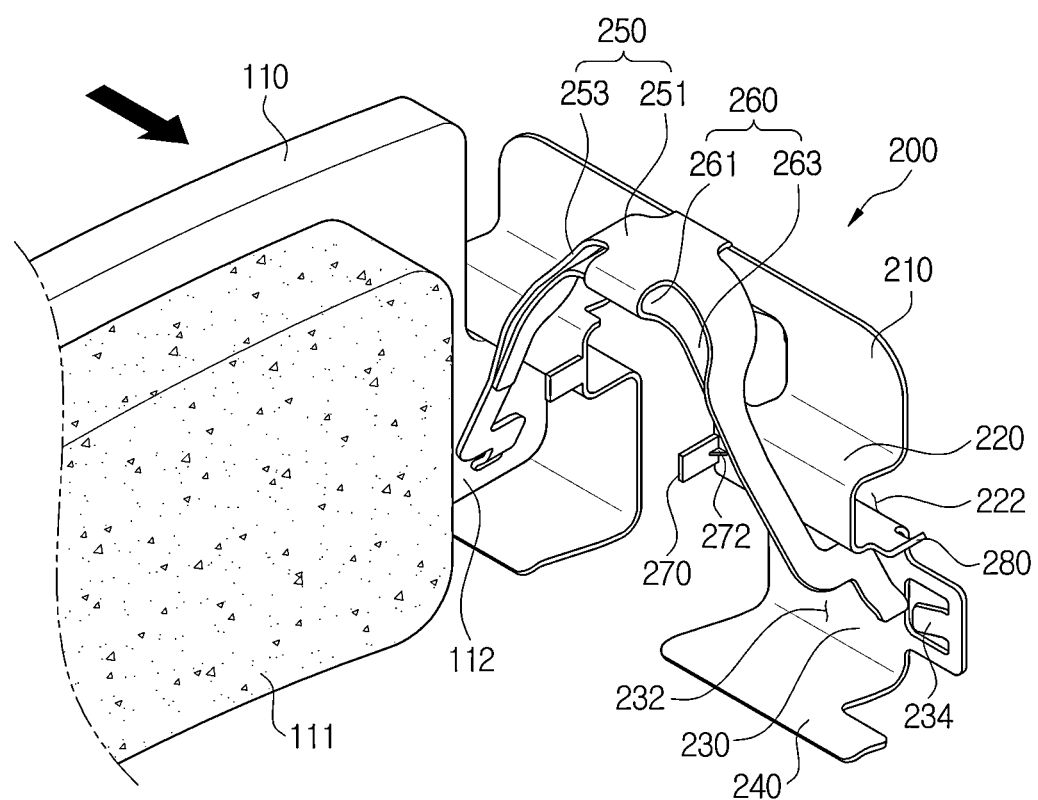

[FIG. 9]
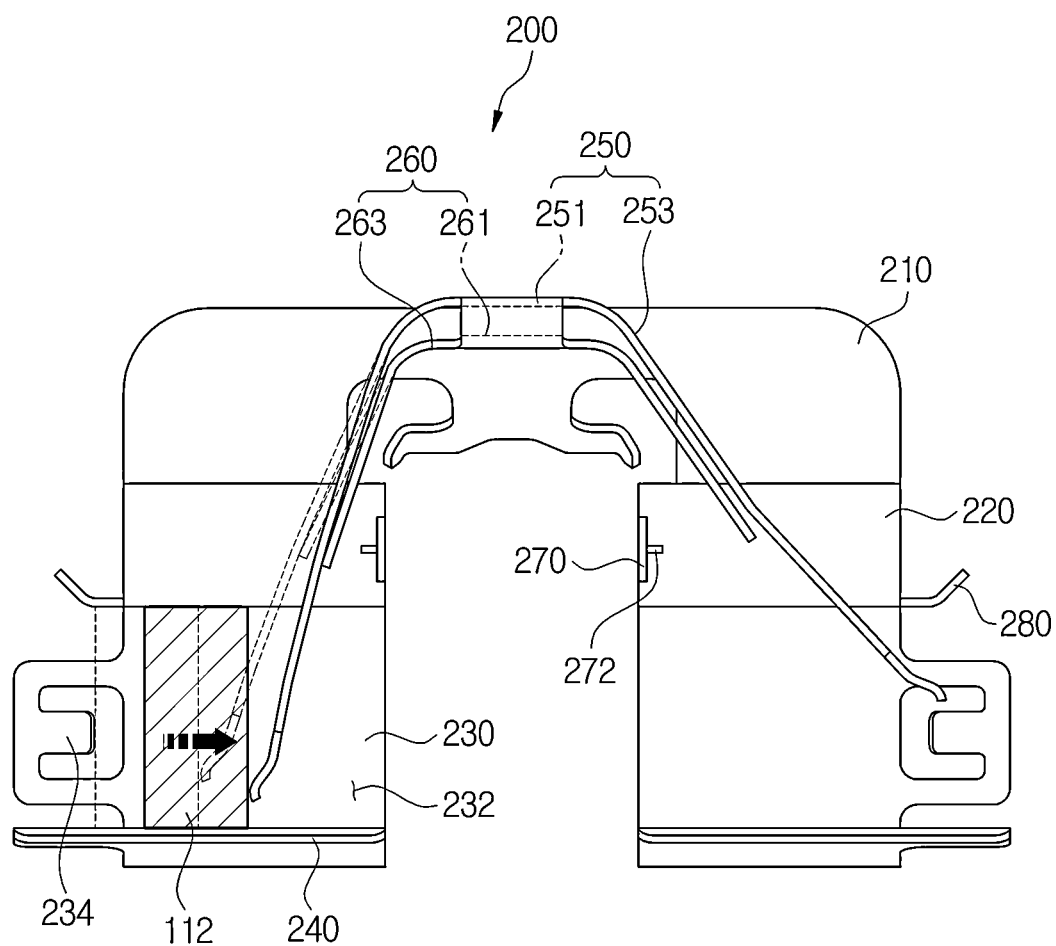

[FIG. 10]
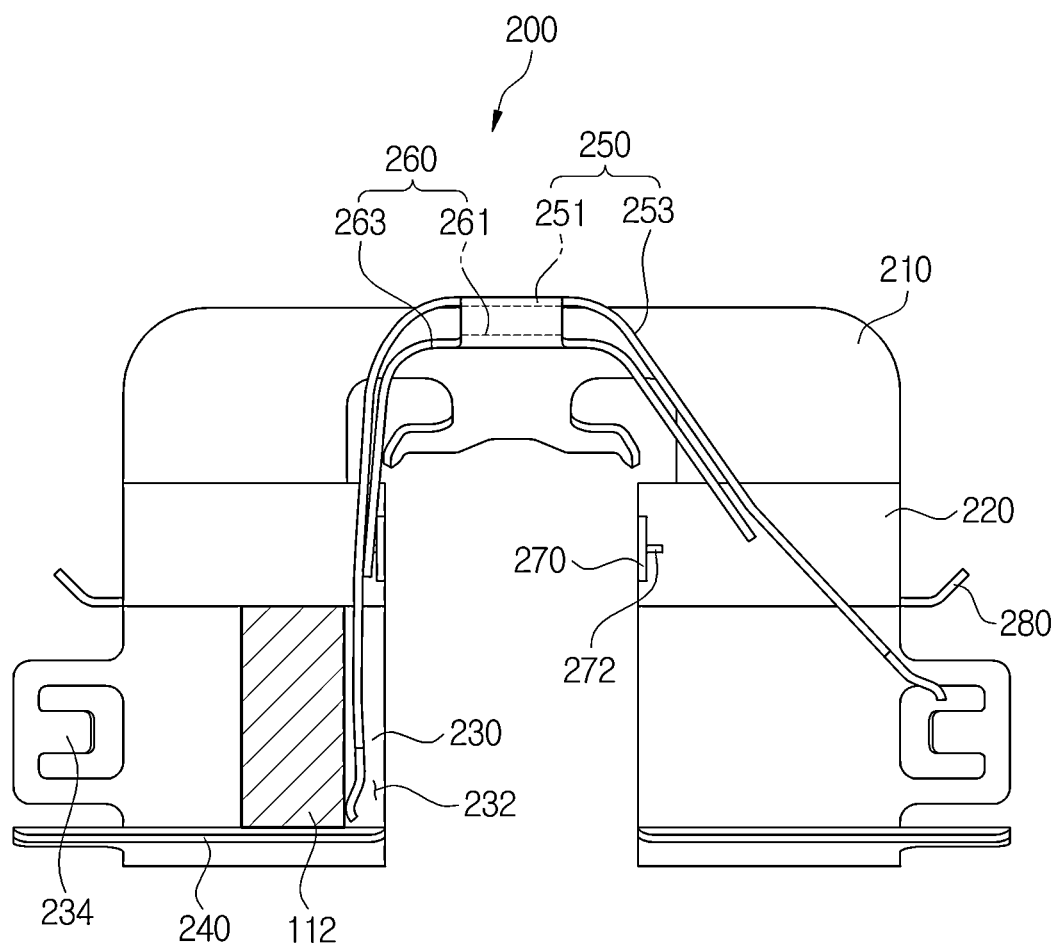

PAD SPRING AND CALIPER BRAKE HAVING THE SAME

CROSS-REFERENCE TO RELATED APPLICATION(S)

This application is based on and claims priority under 35 U.S.C. § 119 to Korean Patent Application No. 10-2021-0108163, filed on Aug. 17, 2021, in the Korean Intellectual Property Office, the disclosure of which is incorporated by reference herein in its entirety.

BACKGROUND

1. Field

The disclosure relates to a pad spring and a caliper brake having the same, and more particularly, to a pad spring capable of preventing a drag phenomenon when braking is released, and a caliper brake having the same.

2. Description of the Related Art

In general, a caliper brake mounted on a vehicle, which is a device for decelerating or stopping the traveling vehicle or maintaining a stopped state, exerts a braking force by strongly pressing a disk rotating together with a wheel with pads on opposite sides of the disk.

The caliper brake includes a carrier on which a pair of pad plates are mounted to be advanced and retreated to press the disk rotating together with the wheel of the vehicle, a caliper housing provided with a cylinder slidably mounted on the carrier through a guide rod and in which a piston is installed to be advanced and retreated by a braking hydraulic pressure, and a pad spring interposed between the carrier and the pair of pad plates to slidably support the pair of pad plates.

In addition, the caliper brake includes a separately provided retraction spring to return the pair of pad plates to their original positions after a braking operation. The retraction spring is installed to provide an elastic force to the pair of pad plates so that the pair of pad plates is returned to their original position after the braking operation. That is, the retraction spring prevents a drag phenomenon in which the disk and friction pads attached to the pair of pad plates continues to rub after the braking operation.

However, as the retraction spring is installed on the pad plates, not only a processing time and an assembly time for installing the retraction spring increase, but also the retraction spring needs to be separately manufactured, so that a material cost and an installation cost may increase.

In addition, as a size of a vehicle (size of the disk) increases, a required load should increase, but a load to be provided through the retraction spring has a limit, so that the required load may not be provided.

In order to solve this, a thickness of a material constituting the retraction spring should be increased, but installation may be difficult depending on limitation of an installation space, and a manufacturing cost may increase.

SUMMARY

It is an aspect of the disclosure to provide a pad spring that is easy to manufacture and install by integrally forming a return part that provides an elastic force to the pad spring, as well as forming a pair of pad plates to quickly return to their initial positions after a braking operation, and a caliper brake having the same.

It is an aspect of the disclosure to provide a pad spring capable of being used even in a vehicle requiring a large load by increasing a load by configuring a return part that applies the load to a pad plate in a double structure, and a caliper brake having the same.

It is an aspect of the disclosure to provide a pad spring capable of reducing a cost and improving performance by reducing a thickness of a material compared to a conventional one by increasing a load through structural improvement, and a caliper brake having the same.

Additional aspects of the disclosure will be set forth in part in the description which follows and, in part, will be obvious from the description, or may be learned by practice of the disclosure.

In accordance with an aspect of the disclosure, a pad spring, which is installed on a coupling projection protruding from a carrier to slidably support a pair of pad plates, includes a first return part formed to extend downwardly from an upper side of the pad spring to elastically support and return the pad plate to its original position, and a second return part spaced apart from the first return part by a predetermined distance and provided at a position where the first return part is elastically deformed depending on an operation of the pad plate, wherein when the first return part is elastically deformed, the second return part comes into contact with the first return part to be elastically deformed together with the first return part and apply an elastic restoring force to the pad plate.

In accordance with another aspect of the disclosure, a caliper brake includes a pair of pad plates to which friction pads are attached to press opposite sides of a disk rotating together with a wheel, respectively, a carrier having slide grooves into which protrusions formed on opposite sides of each of the pad plates are fitted and coupling projections formed on upper sides of the slide grooves to allow the pair of pad plates to be installed so as to be advanced and retreated with respect to the disk, a caliper housing slidably mounted on the carrier to operate the pair of pad plates, and pad springs installed on the coupling projections, respectively, to be interposed between the carrier and the pair of pad plates so as to slidably support the pair of pad plates, wherein the pad spring includes a first return part formed to extend downwardly from an upper side of the pad spring to elastically support and return the pad plate to its original position, and a second return part spaced apart from the first return part by a predetermined distance and provided at a position where the first return part is elastically deformed depending on an operation of the pad plate, and wherein when the first return part is elastically deformed, the second return part comes into contact with the first return part to be elastically deformed together with the first return part and apply an elastic restoring force to the pad plate.

The first return part may include a first body portion formed to extend forward from an upper side of the pad spring, and first elastic arms formed to be inclined downward by extending to be bent from opposite ends of the first body portion, respectively, so as to be elastically deformable from the first body portion.

The second return part may include a second body portion having a bent portion bent from a front end of the first body portion to direct to the rear of the pad spring so as to extend toward the rear side, and second elastic arms formed to be inclined downward by extending to be bent from opposite ends of the second body portion, respectively, so as to be elastically deformable from the second body portion.

The second elastic arm may be provided to have a shorter length than that of the first elastic arm.

The carrier may be provided with slide grooves corresponding to protrusions respectively protruding from opposite sides of the pair of pad plates, and the coupling projections formed on upper sides of the slide grooves, and the pad spring may further include a guide part inserted into the slide groove to slidably support the protrusion, a support part extending to be bent toward the front from a lower end of the guide part so as to elastically support a lower end of the pad plate, a coupling part extending to be bent from an upper end of the guide part so as to be coupled to surround the coupling projection, and an upper close-contact part formed to extend from an upper end of the coupling part so as to be in close contact with an upper surface of the carrier.

The pad spring may further include a stopper provided on a path in which the first and second return parts are elastically deformed to limit an elastic deformation distance of the first and second return parts by coming into contact with the first return part or the second return part.

The stopper may extend to be bent toward the front from the coupling part.

The stopper may be provided with a deformation preventing part to prevent deformation of the stopper.

The first and second return parts may be formed on the upper close-contact part.

A protruding piece protruding toward the front may be provided at an outer side end of the guide part, and the protruding piece supports a rear side of the protrusion to prevent separation of the pad plate.

The pad spring may be formed in a single body by bending a plurality of times.

BRIEF DESCRIPTION OF THE DRAWINGS

These and/or other aspects of the disclosure will become apparent and more readily appreciated from the following description of the embodiment, taken in conjunction with the accompanying drawings of which:

FIG. 1 is an exploded perspective view of a caliper brake according to an embodiment of the disclosure;

FIG. 2 is a perspective view of a pad spring according to an embodiment of the disclosure;

FIG. 3 is a rear perspective view of the pad spring illustrated in FIG. 2;

FIG. 4 is a side view illustrating a state in which the pad spring is assembled to a carrier according to an embodiment of the disclosure;

FIG. 5 is a partial perspective view illustrating a state in which a pad plate is installed on the pad spring according to an embodiment of the disclosure;

FIG. 6 is a partial front cross-sectional view of FIG. 5;

FIG. 7 is a partial perspective view illustrating a state in which separation of the pad plate is prevented by a protrusion provided on the pad spring according to an embodiment of the disclosure;

FIG. 8 is a partial perspective view illustrating a state in which return parts of the pad spring are operated depending on a braking operation according to an embodiment of the disclosure;

FIG. 9 is a partial front cross-sectional view of FIG. 8; and

FIG. 10 is a partial front cross-sectional view illustrating a state in which movement of the return parts of the pad spring is restricted by a stopper according to an embodiment of the disclosure.

DETAILED DESCRIPTION

Hereinafter, an embodiment of the disclosure will be described in detail with reference to the accompanying drawings. The embodiment described below is provided by way of example so that those skilled in the art will be able to fully understand the spirit of the disclosure. The disclosure is not limited to the embodiment described below, but may be embodied in other forms. In order to clearly explain the disclosure, parts not related to the description are omitted from the drawings, and sizes of components may be exaggerated for convenience.

FIG. 1 is an exploded perspective view of a caliper brake according to an embodiment of the disclosure.

Referring to FIG. 1, a caliper brake 100 according to an embodiment of the disclosure includes a pair of pad plates 110 to press opposite sides of a disk D rotating together with a wheel (not shown), respectively, a carrier 120 on which the pair of pad plates 110 are installed to be spaced apart from each other by a predetermined distance and to be advanced and retreated with respect to the disk D, a caliper housing 130 slidably installed on the carrier 120 such that the pair of pad plates 110 may press the disk D, and a pad spring 200 interposed between the carrier 120 and the pair of pad plates 110 to slidably support the pair of pad plates 110.

Friction pads 111 that rub against the disk D are attached to inner surfaces of the pair of pad plates 110, respectively, and protrusions 112 are formed at opposite side ends of each of the pad plates 110, respectively. The pair of pad plates 110 include the inner pad plate 110 disposed to be in contact with a piston 131, which will be described later, and the outer pad plate 110 disposed to be in contact with a finger part 132, which will be described later.

The carrier 120 is coupled to and fixed to a knuckle (not shown) of a vehicle body so as to be positioned on one side of an outer circumference of the disk D. Slide grooves 123 are formed on inner opposite sides of the carrier 120 at positions corresponding to the protrusions 112 formed on the opposite side ends of the pair of pad plates 110, and a coupling projection 122 is formed on an upper side of the slide groove 123. A total of the four coupling projections 122 are provided by forming a pair on the inner opposite sides of the carrier 120, respectively.

Guide holes 125 are provided on upper opposite sides of the carrier 120 in parallel to the slide grooves 123. The slide grooves 123 are formed at the front and rear of the carrier 120 so that the pair of pad plates 110 are installed, respectively. That is, as shown in the drawing, the slide grooves 123 formed on the opposite sides of the carrier 120 are spaced apart from each other by a predetermined distance, and a central portion of the carrier 120 has an open shape so that the disk D is smoothly inserted and positioned therein.

The protrusions 112 are fitted into and coupled to the slide grooves 123 so that the pair of pad plates 110 slide along the slide grooves 123 of the carrier 120. That is, when each of the pad plates 110 is advanced along the slide groove 123, each of the friction pads 111 comes into close contact with each side of the disk D to generate a braking force.

The caliper housing 130 is slidably installed on the carrier 120 as guide rods 135 installed at opposite side ends thereof are inserted into the guide holes 125 provided at the opposite sides of the carrier 120, respectively. The caliper housing 130 includes a cylinder 133 in which a piston 131 to press the inner pad plates 110 is installed to be advanced and retreated, and the finger part 132 to press the outer pad plate 110.

The piston 131 is installed in the cylinder 133 to be advanced and retreated. The piston 131 presses the inner pad plate 110 while being advanced when a braking hydraulic pressure is applied to the cylinder 133, and as the caliper housing 130 is moved by the reaction force, the finger part 132 presses the outer pad plate 110 toward the disk D side. Accordingly, the pair of pad plates 110 press the disk D to generate a braking force.

The pad spring 200 is installed on the carrier 120 to slidably support the pair of pad plates 110. According to an aspect of the disclosure, the pad spring 200 is provided to be coupled to the coupling projection 122. That is, a pair of the pad springs 200 are installed on the inner opposite sides of the carrier 120, respectively, to slidably support the pad plate 110 from the opposite sides. The pad spring 200 as described above will be described with reference to FIGS. 2 to 10.

FIG. 2 is a perspective view of a pad spring according to an embodiment of the disclosure, FIG. 3 is a rear perspective view of the pad spring illustrated in FIG. 2, FIG. 4 is a side view illustrating a state in which the pad spring is assembled to a carrier according to an embodiment of the disclosure, FIG. 5 is a partial perspective view illustrating a state in which a pad plate is installed on the pad spring according to an embodiment of the disclosure, FIG. 6 is a partial front cross-sectional view of FIG. 5, FIG. 7 is a partial perspective view illustrating a state in which separation of the pad plate is prevented by a protrusion provided on the pad spring according to an embodiment of the disclosure, FIG. 8 is a partial perspective view illustrating a state in which return parts of the pad spring are operated depending on a braking operation according to an embodiment of the disclosure, FIG. 9 is a partial front cross-sectional view of FIG. 8, and FIG. 10 is a partial front cross-sectional view illustrating a state in which movement of the return parts of the pad spring is restricted by a stopper according to an embodiment of the disclosure.

Referring to FIGS. 2 to 10, the pad spring 200 according to the disclosure may include a guide part 230, a support part 240 connected to a lower end of the guide part 230, a coupling part 220 connected to an upper end of the guide part 230, an upper close-contact part 210 connected to an upper end of the coupling part 220, and a first return part 250 and a second return part 260 extending to be bent from the upper close-contact part 210. The upper close-contact part 210, the coupling part 220, the guide part 230, the support part 240, and the first and second return parts 250 and 260, which constitute the pad spring 200, may be formed in a single body by bending a plurality of times.

More specifically, a pair of the pad springs 200 are provided to slidably support the pair of pad plates 110 from the opposite sides, respectively. That is, one of the pad springs 200 supports one sides of the pair of pad plates 110, and the other of the pad springs 200 supports the other sides of the pair of pad plates 110. Accordingly, the pad spring 200 may be formed such that the coupling part 220, the guide part 230, the support part 240, a first elastic arm 253 of the first return part 250, and a second elastic arm 263 of the second return part 260 are symmetrical on opposite sides with respect to the center of the upper close-contact part 210.

The upper close-contact part 210 is formed to be in close contact with an upper one side of the carrier 120. The first return part 250 and the second return part 260 are provided on the upper close-contact part 210. The first and second return parts 250 and 260 will be described again below.

A pair of the coupling parts 220 may be provided on opposite sides of the upper close-contact part 210, respectively, to be symmetrical with each other. The coupling part 220, which is a part that is coupled to the coupling projection 122 of the carrier 120, may extend to be bent from a lower portion of the upper close-contact part 210 so that a coupling groove 222 into which the coupling projection 122 is fitted is formed. Accordingly, the coupling parts 220 are provided to be positioned on an upper ends of the protrusions 112 of the two pad plates 110.

The guide parts 230 are formed to extend from lower ends of the pair of coupling parts 220, respectively. The guide part 230, which is a part that is coupled to the slide groove 123, may be provided such that a guide groove 232 corresponding to the protrusion 112 is formed. The guide groove 232 may be provided to have a higher height than that of the protrusion 112 so that the protrusion 112 may slide smoothly.

A protruding piece 234 may be provided on the pad spring 200 to prevent the pad plate 110 from being separated. The protruding piece 234 may be formed to protrude from the guide part 230. As illustrated in FIG. 7, the protruding piece 234 is formed to protrude forward from an outer side end of the guide part 230. That is, the protruding piece 234 supports a rear side of the protrusion 112 in a state in which the pad plate 110 is coupled to the pad spring 200, thereby preventing the pad plate 110 from being separated from the pad spring 200.

The support part 240 may extend to be bent forward from the lower end of the guide part 230 to support a lower portion of the protrusion 112. That is, the support part 240 is formed to be bent in a direction substantially perpendicular to an inner surface of the guide part 230 together with a function as a bottom surface of the guide part 230, thereby supporting a load of the pad plate 110. The support part 240 described above is provided to be elastically deformed when the protrusion 112 is coupled to the guide part 230, thereby elastically supporting the protrusion 112. Accordingly, the support part 240 absorbs shaking caused by vibration and presses the protrusion 112 to a lower portion of the coupling projection 122 so that the pad plate 110 and the pad spring 200 are maintained in a stable coupling state.

The first return part 250 is elastically deformed during operation of the pad plate 110 by elastically supporting the pad plate 110 in a moving direction of the pad plate 110, and serves to return the pad plate 110 to its original position through an elastic restoring force. The first return part 250 may be formed to extend downwardly from an upper side of the pad spring 200. As illustrated in the drawings, the first return part 250 may include a first body portion 251 extending forward from an upper side of the center of the upper close-contact part 210, and a pair of the first elastic arms 253 extending from opposite ends of the first body portion 251 to be inclined downward, respectively.

The first return part 250 described above is formed to provide a load (elastic restoring force) to the pad plate 110 while avoiding interference with surrounding structures. That is, the first body portion 251 of the first return part 250 extends to be bent from the upper close-contact part 210 so as to direct to the same direction as a protruding direction of the coupling projection 122, and the first elastic arm 253 has a shape of being curved a plurality of times in a longitudinal direction so as to be in stable contact with the protrusion 112 inserted into the guide part 230 while avoiding contact with the coupling part 220 located thereunder.

The first elastic arm 253 is formed to be bent from the first body portion 251 so as to be elastically deformable. That is, when the first elastic arm 253 is moved by being pressed from the pad plate 110, the first elastic arm 253 rotates based on a portion bent from the first body portion 251 to generate an elastic restoring force.

The second return part 260 serves to return the pad plate 110 to its original position together with the first return part 250. The second return part 260 is spaced apart from the first return part 250 by a predetermined distance and may be provided at a position where the first return part 250 is elastically deformed. More specifically, the second return part 260 may include a second body portion 261 having a bent portion bent from a front end of the first body portion 251 and formed to direct to the rear of the pad spring 200, and the second elastic arm 263 extending to be bent from opposite ends of the second body portion 261 to be elastically deformable from the second body portion 261 so as to be inclined downward.

The second elastic arm 263 is elastically deformed together with the first elastic arm 253 by coming into contact with the first elastic arm 253 upon the elastic deformation of the first elastic arm 253 to provide an elastic restoring force to the pad plate 110. The second elastic arm 263 is provided to have a shorter length than that of the first elastic arm 253. This is to provide a large load to the pad plate 110, and because the load generated while the second elastic arm 263 having a short length is elastically deformed acts larger, compared to the load generated as an end side of the first elastic arm 253 having a relatively long length is pressed and elastically deformed. Therefore, as a load is transferred to the pad plate 110 with the addition of the elastic restoring force generated by elastically deforming the first and second elastic arms 253 and 263, the first and second elastic arms 253 and 263 may smoothly return the pad plate 110 to its original position, and may also be applied to a caliper brake requiring a large load.

The first and second elastic arms 253 and 263 described above are provided in a partially pressed state when the pad plate 110 is mounted on the pad spring 200.

According to an aspect of the disclosure, the pad spring 200 may further include a stopper 270 provided to limit an elastic deformation distance of the first and second elastic arms 253 and 263 by coming into contact with the first elastic arm 253 or the second elastic arm 263 depending on the elastic deformation of the first and second return parts 250 and 260. The stopper 270 extends to be bent from the coupling part 220 so as to be provided on a path where the first and second elastic arms 253 and 263 are pressed and elastically deformed. As illustrated in the drawings, the stopper 270 extends to be bent forward from an inner end of the coupling part 220. The disclosure exemplifies that the stopper 270 is provided at a position where the second elastic arm 263 comes into contact with the stopper 270 to limit movement, but is not limited thereto, and the stopper 270 may be provided such that the first elastic arm 253 comes into contact with the stopper 270 to limit movement. That is, as the first and second elastic arms 253 and 263 come into contact with the stopper 270 while being elastically deformed by the pad plate 110, the first and second elastic arms 253 and 263 are no longer elastically deformed and the movement thereof is limited. Accordingly, plastic deformation to be generated as the first and second return parts 250 and 260 are excessively deformed may be prevented.

The stopper 270 is provided with a deformation preventing part 272 to prevent deformation of the stopper 270. The deformation preventing part 272 is formed to have an embossed shape through press processing or the like at a bent position of the stopper 270, thereby increasing the rigidity against deformation.

A rib 280 may be provided at an appropriate position of the pad spring 200 so that deformation of the pad spring 200 is prevented and the pad spring 200 is stably fixed to the carrier 120.

As is apparent from the above, a pad spring according to an embodiment of the disclosure and a caliper brake having the same are easy to manufacture and install by integrally forming a return part that applies a load (elastic force) to a pad plate to the pad spring, and can prevent a drag phenomenon as well as quickly return the pad plate to its initial position.

Furthermore, the pad spring according to an embodiment of the disclosure and the caliper brake having the same can be used even in a vehicle requiring a large load by increasing a load by configuring the return part that applies the load to the pad plate in a double structure. That is, a cost can be reduced and performance can be improved at the same time by reducing a thickness of a material compared to a conventional one by increasing the load through structural improvement.

While the disclosure has been particularly described with reference to an exemplary embodiment, it should be understood by those of skilled in the art that various changes in form and details may be made without departing from the spirit and scope of the disclosure.

What is claimed is:

1. A pad spring, which is installed on a coupling projection protruding from a carrier to slidably support a pair of pad plates, comprising:
    a first return part formed to extend downwardly from an upper side of the pad spring to elastically support and return the pair of pad plates to its original position; and
    a second return part spaced downward apart from the first return part by a predetermined distance and provided at a position where the first return part is elastically deformed depending on an operation of the pair of pad plates,
    wherein the first return part comprises:
        a first body portion formed to extend forward from an upper side of the pad spring; and
        first elastic arms formed to be inclined downward by extending to be bent from opposite ends of the first body portion, respectively, so as to be elastically deformable from the first body portion,
    wherein the second return part comprises:
        a second body portion spaced downward apart from the first body portion; and
        second elastic arms formed to be inclined downward by extending to be bent from opposite ends of the second body portion, respectively, so as to be elastically deformable from the second body portion,
    wherein when the first return part is elastically deformed, the second return part comes into contact with the first return part to be elastically deformed together with the first return part and apply an elastic restoring force to the pair of pad plates.

2. The pad spring according to claim 1, wherein the second body portion has a bent portion bent from a front end of the first body portion to direct to a rear side of the pad spring so as to extend toward the rear side of the pad spring.

3. The pad spring according to claim 1, wherein the second elastic arms are provided to have a shorter length than that of the first elastic arms.

4. The pad spring according to claim 2, wherein the carrier is provided with slide grooves corresponding to protrusions respectively protruding from opposite sides of the pair of pad plates, and the coupling projection formed on upper sides of the slide grooves, and the pad spring further comprises:

a guide part inserted into a respective one of the slide grooves to slidably support a respective one of the protrusions;

a support part extending to be bent toward the front end of the first body portion from a lower end of the guide part so as to elastically support a lower end of the pair of pad plates;

a coupling part extending to be bent from an upper end of the guide part so as to be coupled to surround the coupling projection; and an upper close-contact part formed to extend from an upper end of the coupling part so as to be in close contact with an upper surface of the carrier.

5. The pad spring according to claim 4, further comprising a stopper provided on a path in which the first and second return parts are elastically deformed to limit an elastic deformation distance of the first and second return parts by coming into contact with the first return part or the second return part.

6. The pad spring according to claim 5, wherein the stopper extends to be bent toward the front end of the first body portion from the coupling part.

7. The pad spring according to claim 6, wherein the stopper is provided with a deformation preventing part to prevent deformation of the stopper.

8. The pad spring according to claim 4, wherein the first and second return parts are formed on the upper close-contact part.

9. The pad spring according to claim 4, wherein a protruding piece protruding toward the front end of the first body portion is provided at an outer side end of the guide part, and the protruding piece supports a rear side of the respective protrusion to prevent separation of the pair of pad plates.

10. The pad spring according to claim 4, wherein the pad spring is formed in a single body by bending a plurality of times.

11. A caliper brake comprising:
a pair of pad plates to which friction pads are attached to press opposite sides of a disk rotating together with a wheel, respectively;
a carrier having slide grooves into which protrusions formed on opposite sides of each pad plate of the pair of pad plates are fitted and coupling projections formed on upper sides of the slide grooves to allow the pair of pad plates to be installed so as to be advanced and retreated with respect to the disk;
a caliper housing slidably mounted on the carrier to operate the pair of pad plates; and
pad springs installed on the coupling projections, respectively, to be interposed between the carrier and the pair of pad plates so as to slidably support the pair of pad plates,
wherein a pad spring of the pad springs comprises:
a first return part formed to extend downwardly from an upper side of the pad spring to elastically support and return the respective pad plate to its original position; and
a second return part spaced downward apart from the first return part by a predetermined distance and provided at a position where the first return part is elastically deformed depending on an operation of the respective pad plate, and wherein when the first return part is elastically deformed, the second return part comes into contact with the first return part to be elastically deformed together with the first return part and apply an elastic restoring force to the respective pad plate, wherein the first return part comprises:
a first body portion formed to extend forward from an upper side of the pad spring; and
first elastic arms formed to be inclined downward by extending to be bent from opposite ends of the first body portion, respectively, so as to be elastically deformable from the first body portion, and wherein the second return part comprises:
a second body portion spaced downward apart from the first body portion; and
second elastic arms formed to be inclined downward by extending to be bent from opposite ends of the second body portion, respectively, so as to be elastically deformable from the second body portion.

12. The caliper brake according to claim 11, wherein a second body portion has a bent portion bent from a front end of the first body portion to direct to a rear side of the pad spring so as to extend toward the rear side of the pad spring.

13. The caliper brake according to claim 11, wherein the second elastic arms are provided to have a shorter length than that of the first elastic arms.

14. The caliper brake according to claim 12, wherein the pad spring comprises:
a guide part inserted into a respective one of the slide grooves to slidably support a respective one of the protrusions;
a support part extending to be bent toward the front end of the first body portion from a lower end of the guide part so as to elastically support a lower end of the respective pad plate;
a coupling part extending to be bent from an upper end of the guide part so as to be coupled to surround a respective one of the coupling projections; and
an upper close-contact part formed to extend from an upper end of the coupling part so as to be in close contact with an upper surface of the carrier.

15. The caliper brake according to claim 14, wherein the pad spring further comprises a stopper provided on a path in which the first and second return parts are elastically deformed to limit an elastic deformation distance of the first and second return parts by coming into contact with the first return part or the second return part.

16. The caliper brake according to claim 15, wherein the stopper extends to be bent toward the front end of the first body portion from the coupling part and is provided with a deformation preventing part to prevent deformation of the stopper.

17. The caliper brake according to claim 14, wherein the first and second return parts are formed on the upper close-contact part.

18. The caliper brake according to claim 14, wherein a protruding piece protruding toward the front end of the first body portion is provided at an outer side end of the guide part, and the protruding piece supports a rear side of the protrusion to prevent separation of the respective pad plate.

* * * * *